(12) United States Patent
Cottrell, V

(10) Patent No.: US 7,922,265 B1
(45) Date of Patent: Apr. 12, 2011

(54) METHOD FOR CONTROLLING REGENERATIVE AND HYDRAULIC BRAKING

(75) Inventor: Daniel D. Cottrell, V, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/813,557

(22) Filed: Jun. 11, 2010

(51) Int. Cl.
*B60T 13/58* (2006.01)
(52) U.S. Cl. ..................................... 303/152; 303/113.1
(58) Field of Classification Search ............... 303/113.1, 303/152; 180/65.21, 65.265, 65.31, 65.51, 180/165; 701/22
See application file for complete search history.

(56) References Cited

U.S. PATENT DOCUMENTS

| | | | | |
|---|---|---|---|---|
| 5,318,355 A | * | 6/1994 | Asanuma et al. ................. | 303/3 |
| 2003/0080614 A1 | * | 5/2003 | Soga ............................. | 303/152 |
| 2005/0143878 A1 | * | 6/2005 | Park et al. ...................... | 701/22 |
| 2006/0196712 A1 | * | 9/2006 | Toyota et al. .................. | 180/165 |
| 2008/0100129 A1 | * | 5/2008 | Lubbers ....................... | 303/113.1 |
| 2010/0105520 A1 | * | 4/2010 | Ohbayashi et al. ............. | 477/23 |

\* cited by examiner

*Primary Examiner* — Christopher P Schwartz
(74) *Attorney, Agent, or Firm* — Quinn Law Group, PLLC

(57) ABSTRACT

A method for controlling hydraulic and regenerative braking includes commanding variable regenerative braking upon depression of a brake actuator until the regenerative braking reaches a threshold level, and commanding variable hydraulic braking in a wheel circuit. Commanding variable hydraulic braking includes: preventing transfer of fluid pressure from a master cylinder circuit through the ABS valve to the wheel circuit when the fluid in the master cylinder circuit is between a first pressure and a second pressure; partially limiting transfer of fluid pressure from the master cylinder circuit through the ABS valve to the wheel circuit when the fluid in the master cylinder circuit is between the second pressure and a third pressure; and allowing full transfer of fluid pressure from the master cylinder circuit through the ABS valve to the wheel circuit when the fluid in the master cylinder circuit is greater than the third pressure.

13 Claims, 3 Drawing Sheets

METHOD FOR CONTROLLING REGENERATIVE AND HYDRAULIC BRAKING

TECHNICAL FIELD

This disclosure relates generally to control of hydraulic braking and regenerative braking in hybrid electric and electric vehicles.

BACKGROUND

Hybrid electric vehicles and electric vehicles may utilize hydraulic brakes to brake, stop or decelerate the vehicle. The hybrid or electric vehicles may also utilize electric machines, such as generators or motor/generators, to decelerate the vehicle through regenerative braking. The electric machines convert kinetic energy into electrical energy which may be stored in an energy storage device, such as a battery. The electrical energy from the energy storage device may then be converted back into kinetic energy for propulsion of the vehicle, or used to power other functions of the vehicle.

SUMMARY

A method for controlling hydraulic braking and regenerative braking is provided. The method is used with a hybrid brake system having a master cylinder circuit and a wheel circuit which are filled with a fluid and are separated by an anti-lock brake system (ABS) valve. The hybrid brake system also has a brake actuator in direct communication with the master cylinder circuit. The method includes allowing depression of the brake actuator in response to a braking request. Depression of the brake actuator creates hydraulic pressure in the master cylinder circuit, beginning at a first pressure or pressure level of the fluid.

The method includes commanding variable regenerative braking upon depression of the brake actuator until the regenerative braking reaches a threshold level, and commanding variable hydraulic braking upon depression of the brake actuator, such that the wheel circuit reaches a commanded wheel circuit pressure. Commanding variable hydraulic braking includes preventing transfer of fluid pressure from the master cylinder circuit through the ABS valve to the wheel circuit when the fluid in the master cylinder circuit is between the first pressure and a second pressure; partially limiting transfer of fluid pressure from the master cylinder circuit through the ABS valve to the wheel circuit when the fluid in the master cylinder circuit is between the second pressure and a third pressure; and allowing full transfer of fluid pressure from the master cylinder circuit through the ABS valve to the wheel circuit when the fluid in the master cylinder circuit is greater than the third pressure.

The method may include determining whether regenerative braking is available and, if regenerative braking is not available, commanding the ABS valve to a bypass state. The bypass state includes commanding variable hydraulic braking to allow full transfer of fluid pressure from the master cylinder circuit through the ABS valve to the wheel circuit when the fluid in the master cylinder circuit is greater than the first pressure.

The method may further include monitoring an actual wheel circuit pressure and bleeding fluid pressure from the wheel circuit when the actual wheel circuit pressure exceeds the commanded wheel circuit pressure. Bleeding fluid pressure from the wheel circuit occurs through the ABS valve.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
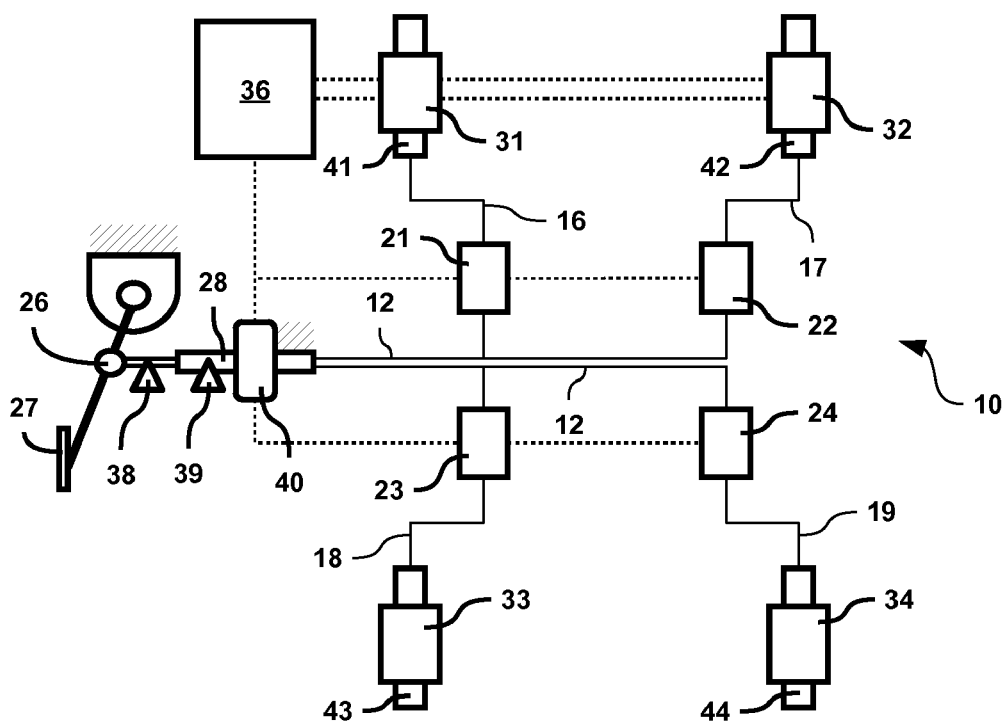
FIG. 1 is a schematic diagram of a hybrid brake system.

Referring to the drawings, wherein like reference numbers correspond to like or similar components throughout the several figures, there is shown in FIG. 1 a schematic diagram of a hybrid brake system 10. When incorporated into a hybrid or electric vehicle (not shown), the brake system 10 is capable of controlling and mixing both hydraulic braking and regenerative braking, which may also be referred to as blended braking.

While the brake system 10 and method for controlling hybrid brake systems are described in detail with respect to automotive applications, those skilled in the art will recognize broader applicability. For example, and without limitation, construction, mining, and other heavy equipment may also incorporate the components, structures, and methods described herein. Those having ordinary skill in the art will also recognize that terms such as "above," "below," "upward," "downward," et cetera, are used descriptively of the figures, and do not represent limitations on the scope of the invention, as defined by the appended claims.

The brake system 10 includes a master cylinder circuit 12 in fluid communication with a first wheel circuit 16, a second wheel circuit 17, a third wheel circuit 18, and fourth wheel circuit 19. The first through fourth wheel circuits 16, 17, 18, 19 (which may be referred to herein as wheel circuits 16-19) are configured to apply hydraulic braking to stop or slow the vehicle.

A first anti-lock brake (ABS) valve 21 links the master cylinder circuit 12 with the first wheel circuit 16, and a second ABS valve 22 links the master cylinder circuit 12 with the second wheel circuit 17. Generally, anti-lock brake valves are part of systems which limit locking or skidding during braking. A third ABS valve 23 links the master cylinder circuit 12 with the third wheel circuit 18, and a fourth ABS valve 24 links the master cylinder circuit 12 with the fourth wheel circuit 19.

The first through fourth ABS valves 21, 22, 23, 24 (which may be referred to herein as ABS valves 21-24) are configured to selectively vary transfer of fluid pressure between the master cylinder circuit 12 and the wheel circuits 16-19. The ABS valves 21-24 may operate in, generally, three different modes. These three modes involve scheduling variable amounts of hydraulic braking, as described herein.

In a first mode, a blocking mode, the ABS valves 21-24 completely restrict or block transfer of fluid pressure. In a second mode, a metered mode, the ABS valves 21-24 may partially or proportionally limit transfer of fluid pressure. In a third mode, an un-metered mode, the ABS valves 21-24 may allow full or direct transfer of fluid pressure—such that the pressure in the master cylinder circuit 12 is substantially equal to the pressure in the wheel circuits 16-19.

In some configurations of the brake system 10, the ABS valves 21-24 may further include a fourth mode. The fourth mode is an equalization mode that allows low-pressure flow in both directions between the master cylinder circuit 12 and the ABS valves 21-24. If the ABS valves 21-24 are not configured with an equalization mode, the ABS valves 21-24 may be closed (as a default) at very low pressures.

The driver or operator of the vehicle requests braking through a brake actuator 26 which may include a brake pedal 27. The brake actuator 26 directly communicates with the master cylinder circuit 12 through a master cylinder 28. The brake actuator 26, therefore, directly controls fluid pressure within the master cylinder circuit 12. Similarly, the fluid pressure within the master cylinder circuit 12 is felt as force feedback in the brake actuator 26. This may be referred to as "pedal feel." As described herein, the ABS valves 21-24 control the amount of pressure transferred between the master cylinder circuit 12 and the wheel circuits 16-19.

A brake booster (not shown), such as a vacuum booster or power brake assist system, may be incorporated into the brake actuator 26, such that forces applied to the brake pedal 27 during a braking request are multiplied. The brake booster would also communicate force feedback from the master cylinder 28 to the brake pedal 27, but would reduce the amount of force felt by the driver.

The wheel circuits 16-19 are in direct fluid communication with a first wheel brake 31, a second wheel brake 32, a third wheel brake 33, and a fourth wheel brake 34, respectively. Each of the first through fourth wheel brakes 31, 32, 33, 34 (which may be referred to herein as wheel brakes 31-34) may be in communication with one or more wheels of the vehicle, such as a first wheel 41, a second wheel 42, a third wheel 43, and a fourth wheel 44 (which may be referred to herein as wheels 41-44). The brake system 10 may be implemented on vehicles having more, or fewer, than four wheels.

Brake fluid in the master cylinder 28 is pressurized by the brake actuator 26. The ABS valves 21-24 selectively allow transfer of the fluid pressure between the master cylinder circuit 12 and the wheel circuits 16-19, where the wheel brakes 31-34 convert the fluid pressure to hydraulic braking force. By varying the fluid pressure transferred to the wheel brakes 31-34, the brake system 10 varies the hydraulic braking force used to brake the vehicle.

The brake system 10 may be configured with only the first wheel circuit 16 and the first ABS valve 21 communicating with each of the wheel brakes 31-34. The master cylinder circuit 12 is shown as two separate circuits communicating with separate chambers or halves of the master cylinder 28. However, the master cylinder circuit 12 may be configured with only a single circuit communicating with both the first ABS valve 21 and the second ABS valve 22.

In FIG. 1, half of the master cylinder circuit 12 is in communication with the first wheel brake 31 (through the first ABS valve 21) and the second wheel brake 32 (through the second ABS valve 22). This may be referred to as a conventionally split system, where one chamber of the master cylinder 28 communicates with the front wheels—either the first and second wheels 41, 42 or the third and fourth wheels 43, 44 may be the front wheels—and the other chamber communicates with the rear wheels. Alternatively, the brake system 10 may be configured as a cross split system, where one chamber of the master cylinder 28 communicates with one of the front wheels (such as the first wheel 41) and one of the rear wheels (such as the third wheel 43) and the other chamber communicates with the other front wheel and the other rear wheel.

Each of the wheel brakes 31-34 utilizes fluid pressure from one of the wheel circuits 16-19 to apply hydraulic braking force to the vehicle. The wheel brakes 31-34 need not be in a 1:1 ratio with the wheels 41-44, such that (for example) the first wheel brake 31 may act on the both the first wheel 41 and the second wheel 42.

The brake system 10 provides regenerative braking with at least one electric machine 36, which may be an electric generator, an electric motor/generator, or a similar device. The electric machine 36 is in power-flow communication with at least one of the wheels 41-44. For example, and without limitation, the electric machine 36 may be in communication with the transmission input shaft (not shown) or with a front or rear axle (not shown). Therefore, when the electric machine 36 is commanded to generate electricity, regenerative braking occurs and the vehicle experiences braking (either slowed or acceleration reduced), regardless of engagement of the hydraulic wheel brakes 31-34.

As described in more detail below, the brake system 10 uses both hydraulic braking and regenerative braking, depending upon the operating conditions of the vehicle and the type of braking request by the driver. The braking request may also come from somewhere other than the vehicle operator, such as from an automatic avoidance system or the vehicle cruise control system.

A position sensor 38 may be operatively attached to the brake actuator 26 to monitor the position of the brake actuator 26 and to generate a position signal therefrom. Similarly, a pressure sensor 39 may be in communication with the master cylinder 28 to monitor the pressure of the master cylinder 28 (introduced by the brake actuator 26) and to generate a pressure signal therefrom. The position signal and the pressure signal are, therefore, representative of the braking request.

A controller 40 may be in communication with either the position sensor 38, the pressure sensor 39, or both (if the brake system 10 includes both types of sensors). The controller 40 is also in communication with the electric machine 36, and may be in communication with the ABS valves 21-24. The controller 40 may be used to schedule and control regenerative braking, hydraulic braking, or both. By commanding varying levels of hydraulic pressure at the wheel brakes 31-34, the controller 40 varies the amount of hydraulic braking force generated by the brake system 10. The controller 40 may be a stand-alone controller, a portion or function of the vehicle's electronic control unit (ECU), or a portion or function of the hybrid control processor or module (HCP or HCM).

Figure 2:
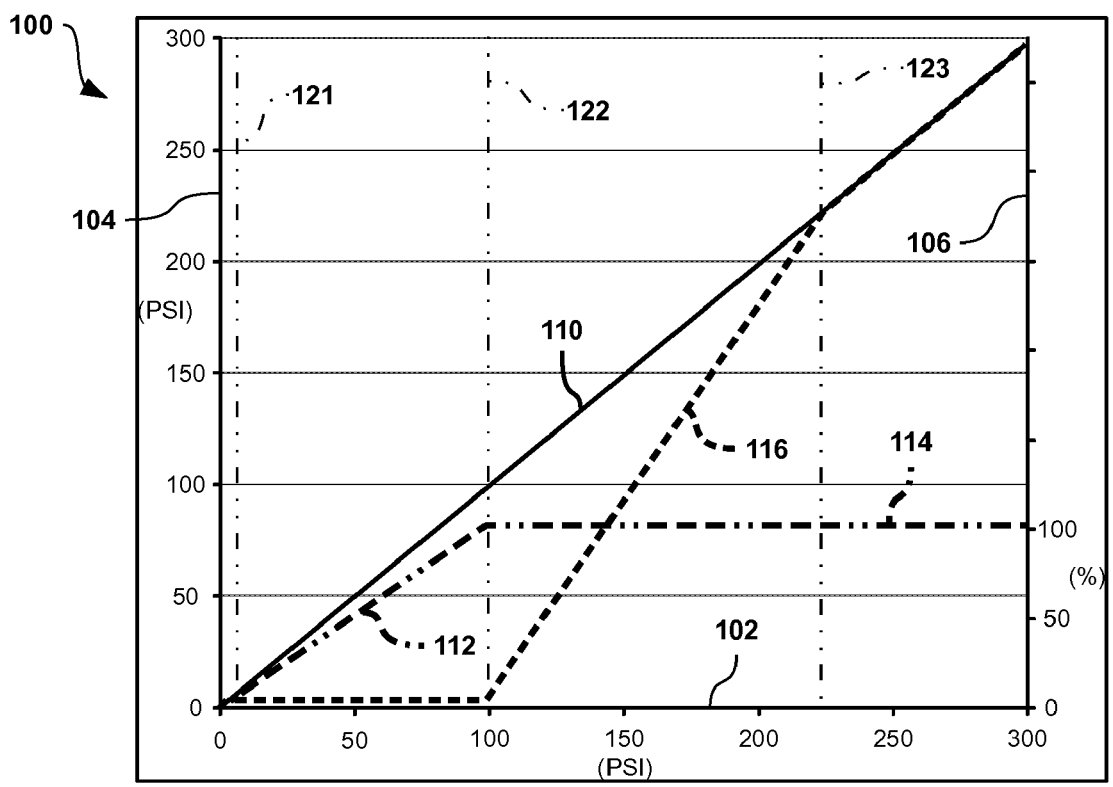
FIG. 2 is a schematic hybrid braking control chart or graph of illustrative characteristics of the hybrid brake system shown in FIG. 1 during hybrid braking.

Referring now to FIG. 2, and with continued reference to FIG. 1, there is shown a hybrid braking control chart 100, which schematically demonstrates scheduling characteristics of the brake system 10 during hybrid, mixed, or blended braking. On the x-axis 102 of the chart 100 is the pressure within the master cylinder circuit 12, which is also the force-feedback pressure felt by the brake actuator 26. Generally, increasing pressure values along the x-axis 102 represent a more-significant braking request by the vehicle operator than relatively lower pressure values.

On the left side y-axis 104 of the chart 100 is the hydraulic braking pressure, which is the fluid pressure within the wheel circuits 16-19. Generally, increasing pressure values along the left side y-axis 104 represent more pressure transferred to the wheel brakes 31-34.

On the right side y-axis 106 of the chart 100 is the regenerative braking utilization, which is depicted as a percentage of the total regenerative braking force available. Generally, increasing percentage values along the right side y-axis 106 represent increased utilization of regenerative braking capacity.

Furthermore, increasing regenerative braking may equate to increasing fuel economy, as relatively more of the kinetic energy of the vehicle is being converted to electrical energy for later use. The amount of available regenerative braking force (or torque) varies greatly based upon, for example and without limitation: operating speed and acceleration of the vehicle, conditions of the electric machine 36, conditions of the batteries or other energy storage devices (not shown) of the vehicle, and ambient conditions.

The numerical values shown on the x-axis 102, the left side y-axis 104, and the right side y-axis 106, and throughout the remainder of the chart 100 and the description herein, are illustrative only and do not represent limits of the brake system 10 or the methods described herein. Additionally, the relative values of the left side y-axis 104 (hydraulic braking pressure) compared to the right side y-axis 106 (percentage of regenerative braking capacity) may be arbitrary, and no direct conversion or equivalence should be interpreted therefrom.

The chart 100 shows multiple, and alternative, braking schedules. An un-metered schedule 110 shows full transfer of fluid pressure from the master cylinder circuit 12 to the wheel circuits 16-19. While operating on the un-metered schedule 110, the pressure of the master cylinder circuit 12 (shown on the x-axis 102) is substantially equal to the pressure in the wheel circuits 16-19 (shown on the left side y-axis 104). The un-metered schedule 110 may also be representative of a bypass mode, which includes either allowing full transfer of fluid pressure through the ABS valves 21-24 or opening a bypass circuit or route (not shown in FIG. 1) around the ABS valves 21-24.

A regenerative schedule 112 shows the utilization of regenerative braking as a percentage of the maximum available regenerative braking (shown on the right side y-axis 106). Regenerative braking is scheduled by the controller 40 based upon vehicle conditions and the brake request by the operator. Movement along the regenerative braking schedule 112 may coincide with movement of the brake actuator 26, as measured by either the position sensor 38 or the pressure sensor 39.

As shown in FIG. 2, the regenerative schedule 112 increases the amount of regenerative braking quickly until reaching a threshold level 114, which, in this illustrative schedule, is approximately one-hundred percent of the maximum. Alternatively, the threshold level 114 may be a lower percentage such as (80-95%) of the maximum braking available, or may be based upon the amount of power being generated by the electric machine 36. After reaching the threshold level 114, the regenerative schedule 112 maintains regenerative braking at the maximum, in order to capture all available kinetic energy for conversion to electrical energy.

As shown in FIG. 2, if hydraulic braking is commanded to operate on the un-metered schedule 110 and regenerative braking is commanded to operate on the regenerative schedule 112, the wheel brakes 31-34 will begin braking the vehicle prior to the electric machine 36 reaching its maximum regenerative braking capability. Because the wheel brakes 31-34 operate by converting kinetic energy to heat, which is not generally recouped by the brake system 10, potential regenerative braking energy is lost to heat energy dissipated by the wheel brakes 31-34.

A metered hydraulic schedule 116 shows the brake system 10 delaying onset of hydraulic braking. Therefore, more of the vehicle's kinetic energy may be captured through regenerative braking by the electric machine 36 before the wheel brakes 31-34 begin to convert kinetic energy into heat energy. As the brake actuator 26 is depressed or otherwise actuated, the pressure in the master cylinder 28 and master cylinder circuit 12 increases to a first pressure 121, as shown on the metered hydraulic schedule 116. On the illustrative chart 100 shown in FIG. 2, the first pressure 121 may be approximately 5-10 pounds per square inch (PSI). Prior to reaching the first pressure 121, the ABS valves 21-24 may be in the equalization mode, freely allowing transfer of low-pressure fluid between the master cylinder circuit 12 and the wheel circuits 16-19.

However, beyond the first pressure 121, further increases in pressure of the master cylinder circuit 12 are prevented from being transferred to the wheel circuits 16-19 by the ABS valves 21-24 until the pressure in the master cylinder circuit 12 reaches a second pressure 122. On the illustrative chart 100 shown in FIG. 2, the second pressure 122 may be approximately 100 PSI. Between the first pressure 121 and the second pressure 122, the ABS valves 21-24 are operating in the blocking mode.

While the ABS valves 21-24 are operating in the blocking mode, the increasing pressure in the master cylinder circuit 12 (as shown on the metered hydraulic schedule 116) provides feedback force to the brake actuator 26. This feedback force lets the driver know that total braking force is increasing as the regenerative schedule 112 increases regenerative braking with the electric machine 36. Also referred to as pedal feel, the feedback force may be substantially similar to the feedback force the driver would experience if the brake system 10 were operating along the un-metered schedule 110 or utilizing only hydraulic braking.

Because regenerative braking with the electric machine 36 is controlled electronically by the controller 40, there is no opposing reaction force imparted to the brake actuator 26 by the electric machine 36. Without the feedback force provided by the increasing pressure in the master cylinder circuit 12 along the metered hydraulic schedule 116, the only signal to the driver that the vehicle is braking may be vehicle deceleration.

As the braking request increases the pressure in the master cylinder circuit 12 beyond the second pressure 122, the ABS valves 21-24 begin operating in the metered mode. As shown on the metered hydraulic schedule 116, between the second pressure 122 and a third pressure 123 the ABS valves 21-24 partially limit transfer of fluid pressure from the master cylinder circuit 12 to the wheel circuits 16-19. While in the metered mode, increasing pressure within the master cylinder circuit 12 also results in increasing pressure with the wheel circuits 16-19, but full hydraulic braking is not allowed until the third pressure 123 is reached.

In some configurations of the brake system 10, and depending upon the specific type of valve used for the ABS valves 21-24, the second pressure 122 may be set substantially equivalent to, or coincident with, the pressure in the master cylinder circuit 12 when the regenerative braking schedule 112 reaches the threshold level 114. Therefore, as shown on the chart 100, hydraulic braking begins at substantially the same time (or pressure value) as the regenerative braking reaches the maximum and can no longer supply additional regenerative braking force.

If the brake system 10 includes the position sensor 38, the controller 40 may estimate the amount of regenerative braking needed to meet the driver's braking request. If the driver depresses the brake actuator 26 further, the position sensor 38 will signal the increase in travel of the brake actuator 26, and the controller 40 will command an increase in the amount of regenerative braking. If the brake system 10 includes the pressure sensor 39, the controller 40 may determine the amount of regenerative braking needed based upon an estimated equivalent to the pressure generated by the braking request.

After reaching the third pressure 123, the ABS valves 21-24 operate in the un-metered (or wide-open) mode and all fluid pressure from the master cylinder circuit 12 is transferred to the wheel circuits 16-19 to be utilized by the wheel brakes 31-34 to hydraulically brake the vehicle. On the illustrative chart 100 shown in FIG. 2, the third pressure 123 may be between approximately 400-450 PSI. Beyond the third pressure 123, the maximum combined braking force from both regenerative braking and hydraulic braking is utilized to decelerate the vehicle.

Implementation of the control schemes and braking schedules shown in FIG. 2 occurs through the ABS valves 21-24—or through the first ABS valve 21 if only one valve is used. Each of the ABS valves 21-24 may include multiple valve mechanisms and may include various types of valve mechanisms. For example, the ABS valves 21-24 may be "smart" valves capable of altering flow characteristics in response to commands from the controller 40, may be "dumb" valves operating under predetermined conditions, or may be a combination thereof.

During the period between the first pressure 121 and the second pressure 122, the regenerative braking force can be scheduled by the controller 40 to increase with pressure (if the pressure sensor 39 is used) or to increase with travel of the brake actuator 26 (if the position sensor 38 is used). Once the second pressure 122 is reached, the ABS valves 21-24 will open and begin to send fluid to the wheel circuits 16-19 and to the wheel brakes 31-34 at each wheel.

The hydraulic braking schedule, such as the metered hydraulic schedule 116, may be fixed as a function of the braking request communicated to the master cylinder circuit 12 and not varied with respect to the availability of regenerative braking. If regenerative braking is unavailable or very limited, the driver may sense that the vehicle is not braking sufficiently and further depress the brake actuator 26 until the pressure in the master cylinder circuit 12 reaches the second pressure 122 and hydraulic braking begins.

The controller 40 may command partial restriction of the ABS valves 21-24 based upon a first hydraulic braking schedule, which may be substantially similar to the metered hydraulic schedule 116 shown in FIG. 2. The first hydraulic braking schedule may be derived or chosen based upon monitored conditions of the braking request, such that the controller 40 chooses the first hydraulic braking schedule when the braking request meets a first condition set. Furthermore, the availability and quality of regenerative braking during the braking request may factor into scheduling hydraulic braking between the second pressure 122 and the third pressure 123.

The controller 40 and the ABS valves 21-24 may also be configured to schedule transfer of fluid pressure based upon a second hydraulic braking schedule, which is different from the first hydraulic braking schedule. The second hydraulic braking schedule may be derived or chosen based upon monitored conditions of the braking request, such that the controller 40 chooses the second hydraulic braking schedule when the braking request meets a second condition set, which is different from the first condition set. The controller 40 may refer to a 2-D or 3-D lookup table to determine the specific hydraulic braking schedule based upon the specific monitored braking conditions.

If regenerative braking is not available, the controller 40 may command the ABS valves 21-24 to a bypass state. The bypass state allows full transfer of fluid pressure from the master cylinder circuit 12 through the ABS valves 21-24 to the wheel brakes for any fluid pressure greater than the first pressure 121 in the master cylinder circuit 12. Placing the ABS valves 21-24 into a wide-open state can effect the bypass mode without a separate component—such as a dedicated bypass mechanism, bypass valve, or bypass channel—being incorporated into the brake system 10.

During operation of the brake system 10, the vehicle operator may at first request a relatively strong amount of braking and then reduce the braking request to a relatively lower amount. For example, the driver may increase the pressure in the master cylinder circuit 12 to between the second pressure 122 and the third pressure 123, and then reduce the braking request such that the pressure drops below the second pressure 122. When the braking request decreases, the commanded pressure for the wheel circuits 16-19 also decreases.

However, the ABS valves 21-24 generally restrict flow from the master cylinder circuit 12 to the wheel circuits 16-19, but may not allow pressure to flow in the opposite direction and to follow the pressure schedule under decreasing pressure—especially while in the blocking mode or the metered mode. Therefore, the actual pressure in the wheel circuits 16-19 may not decrease along with the decreasing pressure command and may not follow the same pressure line as used during increasing braking pressure.

This may be referred to as a hysteresis loop, where the actual pressure in the wheel circuits 16-19 follows the un-metered schedule 110, rather than the metered hydraulic schedule 116, as the pressure in the master cylinder circuit 12 decreases. When the actual pressure in the wheel circuits 16-19 remains higher than the commanded value—as represented by the metered hydraulic schedule 116—the brake system 10 may be operating at reduced efficiency, because there is additional hydraulic braking that could instead be regenerative braking. This especially occurs while the pressure in the master cylinder circuit 12 is between the first pressure 121 and the second pressure 122.

The ABS valves 21-24 may be equipped with a bleed mode or function to overcome or counteract hysteresis. The controller 40 may monitor actual pressure in the wheel circuits 16-19 and compare that monitored actual pressure to the commanded pressure. If the actual pressure exceeds the commanded pressure, the ABS valves 21-24 may be placed into the bleed mode. The ABS valves 21-24 would begin bleeding or draining fluid pressure from the wheel circuits 16-19 and the wheel brakes 31-34 to a sump or other low pressure area until the correct pressure is achieved. Brake fluid bled from the ABS valves 21-24 is eventually pumped back to a sump or reservoir (not shown) and recirculated through the master cylinder 28 and the remainder of the brake system 10.

Figure 3:
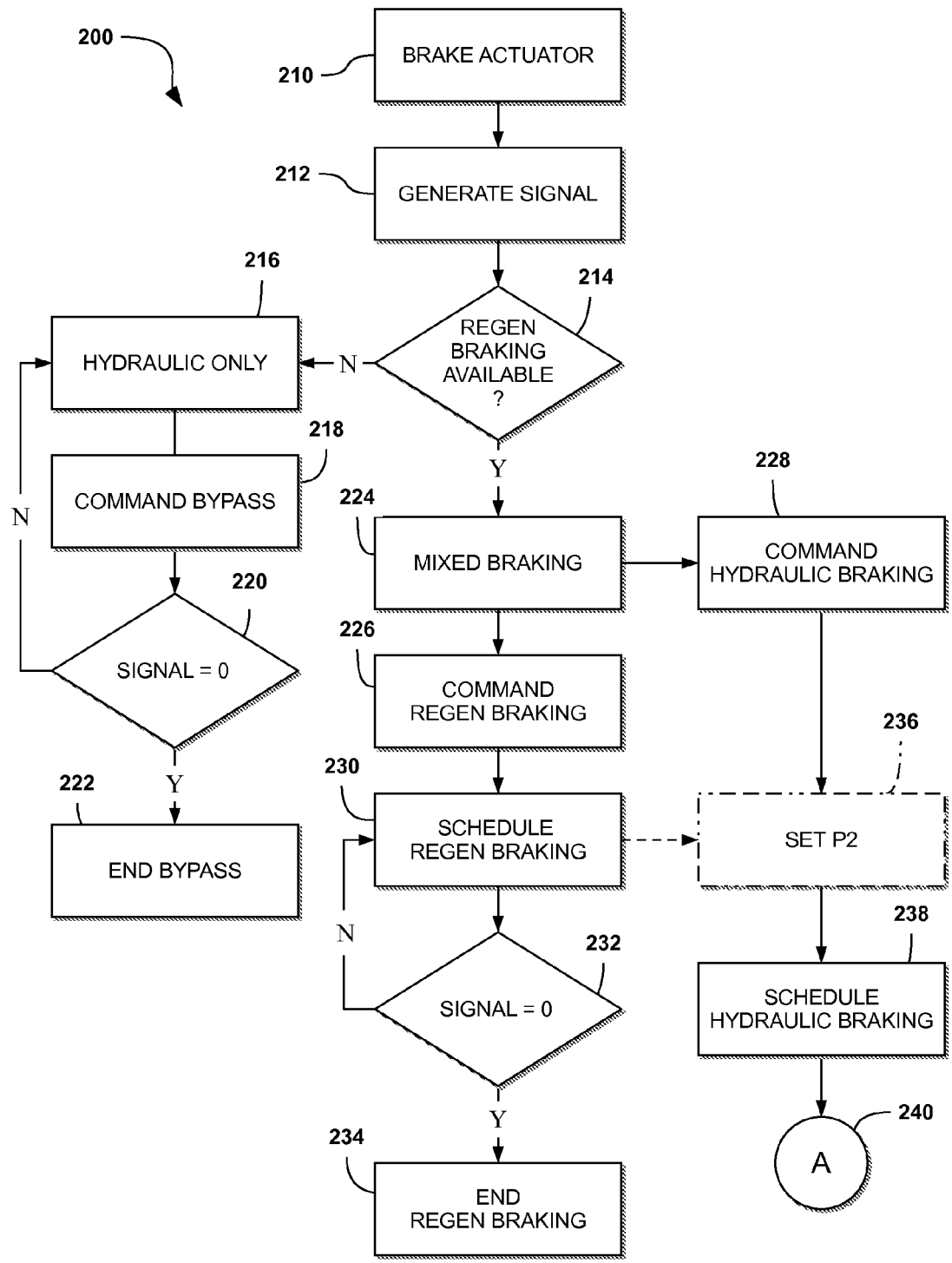
FIG. 3 is a schematic flow chart of a portion of an algorithm or method for controlling hydraulic braking and regenerative braking.
Figure 4:
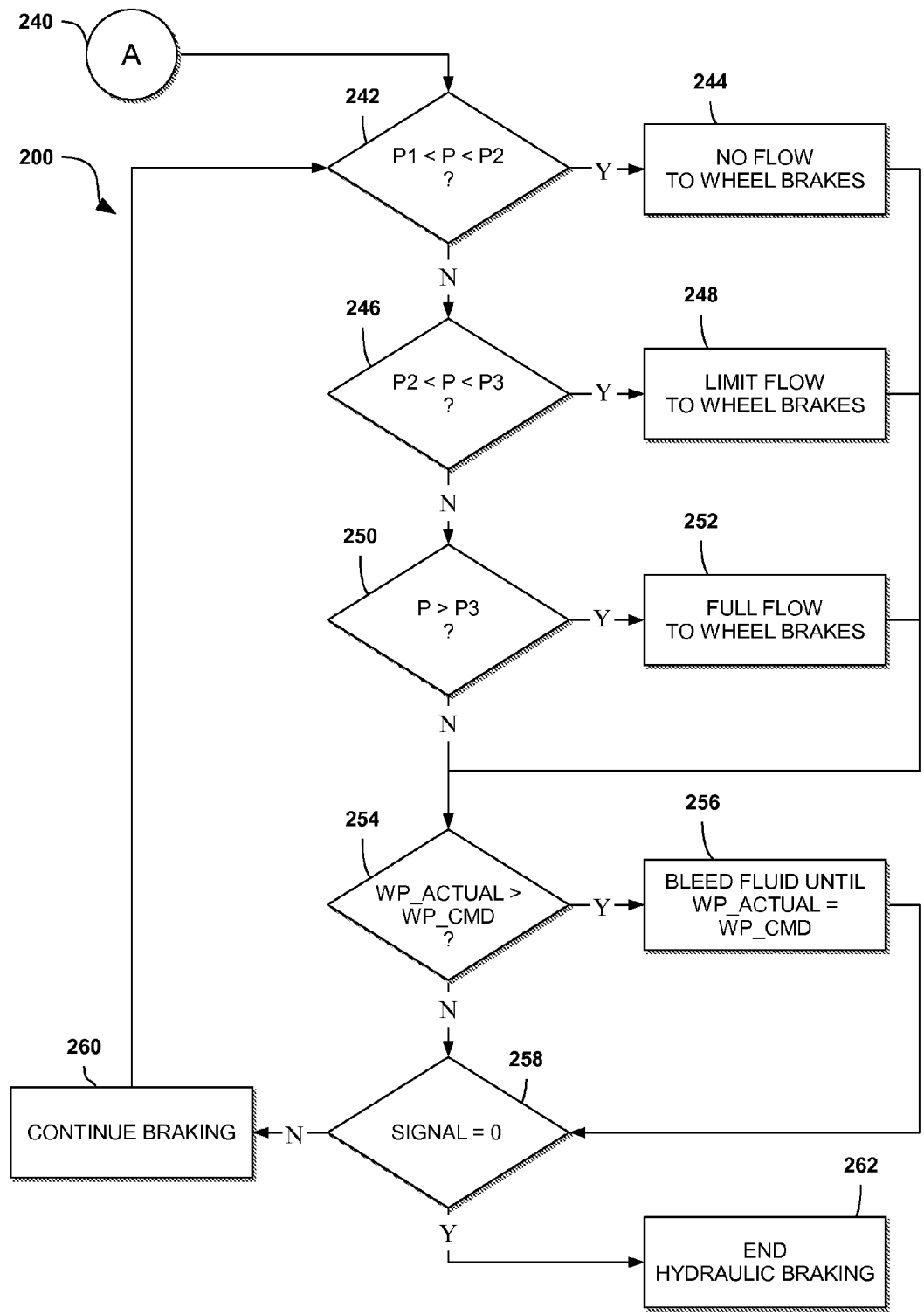
FIG. 4 is another portion of the schematic flow chart shown in FIG. 3.

Referring now to FIGS. 3 and 4, and with continued reference to FIGS. 1 and 2, there is shown an algorithm or method 200 for controlling hydraulic braking and regenerative braking. While much of the method 200 is illustrated and described with respect to the structure shown in FIG. 1 and the braking schedules shown in FIG. 2, other components and braking schedules may be used within the scope of the method.

The method begins at step 210 with actuation or depression of the brake actuator 26 in response to a braking request. Depression of the brake actuator 26 creates hydraulic pressure—beginning at the first pressure 121—in the master cylinder circuit 12. At step 212, depression is sensed by a sensor, such as the position sensor 38 or the pressure sensor 39, and a signal is generated representing the braking request. The signal generated at step 212 may be iterative or continuously varying, and the method 200 may also be looping or continuous.

At step 214, the method 200 determines whether regenerative braking is available. Step 214 may include, for example, testing the state of charge of the battery or calculating availability based upon the temperature of the electric machine 36 and the battery. If step 214 determines that regenerative braking is not available, the method 200 moves to step 216 for only hydraulic braking. At step 218, the controller 40 commands either a bypass mode, such as the bypass state of the ABS valves 21-24, or activation of a bypass device.

At step 220, the method 200 determines whether the braking signal is equal to zero, which generally occurs when the braking request has ended. If the braking request signal is not equal to zero, the method returns to step 216 and continues hydraulic only braking. However, if the signal is equal to zero, the method 200 proceeds to step 222 and ends the bypass braking until another braking request is received.

If step 214 determines that regenerative braking is available, the method proceeds to step 224 for mixed braking, including commanding regenerative braking at step 226 and commanding hydraulic braking at step 228. At step 230 the method 200 schedules the regenerative braking as a function of the braking request—as measured by either the position sensor 38 or the pressure sensor 39. For example, at step 230, the controller 40 may determine that the regenerative schedule 112 shown in FIG. 2 is appropriate based upon operating conditions of the vehicle and the braking request. Generally, the regenerative braking force increases as the braking request (and pressure within the master cylinder circuit 12) increases, until the regenerative braking reaches the threshold level 114.

At step 232, the method 200 determines whether the braking signal is equal to zero, which generally occurs when the braking request has ended. If the braking request signal is not equal to zero, the method returns to step 230 and continues regenerative braking. However, if the signal is equal to zero, the method 200 proceeds to step 234 and ends the regenerative braking until another braking request is received.

After commanding hydraulic braking at step 228, the method 200 may proceed to optional step 236. The controller 40 may utilize the regenerative braking scheduled in step 230 (such as the regenerative schedule 112) to set the second pressure 122, labeled in the schematic flowchart of the method 200 as "P2," for the hydraulic braking (such as the metered hydraulic schedule 116). Therefore, hydraulic braking may not begin until regenerative braking reaches the threshold level 114, maximizing the energy captured by the electric machine 36 before the wheel brakes 31-34 are engaged. Alternatively, the second pressure 122 may be set at a predetermined value or determined from other sources, such as a lookup table.

At step 238, the method 200 schedules hydraulic braking for the brake system 10. Link 240 connects the first portion of the method 200, shown in FIG. 3, to the remaining portion of the method 200, shown in FIG. 4. The method 200 moves from link 240 to determine the magnitude of the braking request, as measured by pressure within the master cylinder circuit 12.

Steps 242-252 generally include determining the magnitude of the braking request (based upon the pressure signal, the position signal, or both) and adjusting flow to the wheel brakes 31-34 based upon the magnitude of the braking request. Steps 242-252 are shown as iterative and looping, but may be continuously monitoring conditions of the braking request in a constant, analog manner. Alternatively, the steps 242-260, especially decision steps 242, 246, 250, and 254, may be executed simultaneously.

The metered hydraulic schedule 116, shown on the chart 100 of FIG. 2, illustrates the different operating modes or flow conditions of the ABS valves 21-24 set during steps 242-252 of the method 200. However, the method 200 and operation of the brake system 10 need not necessarily follow a similar path to that shown in FIG. 2 as the metered hydraulic schedule 116.

At step 242, the method 200 determines whether the pressure within the master cylinder circuit 12, labeled as "P," is between the first pressure 121, labeled in the schematic flowchart of method 200 as "P1," and the second pressure 122. If the pressure within the master cylinder circuit 12 is between the first pressure 121 and the second pressure 122, then the method 200 moves to step 244, and fluid pressure is prevented from flowing or communicating between the master cylinder circuit 12 and the wheel circuits 16-19. This is the portion of the metered hydraulic schedule 116 shown on the chart 100 of FIG. 2 between the first pressure 121 and the second pressure 122.

If step 242 determines that pressure within the master cylinder circuit 12 is not between the first pressure 121 and the second pressure 122, step 246 determines whether the pressure within the master cylinder circuit 12 is between the second pressure 122 and the third pressure 123, labeled in the schematic flowchart of method 200 as "P3." If the pressure within the master cylinder circuit 12 is between the second pressure 122 and the third pressure 123, the method 200 moves to step 248 and partially limits transfer of fluid pressure from the master cylinder circuit 12 through the ABS valves 21-24 to the wheel circuits 16-19. This is the portion of the metered hydraulic schedule 116 shown on the chart 100 between the second pressure 122 and the third pressure 123.

If step 246 determines that pressure within the master cylinder circuit 12 is not between the second pressure 122 and the third pressure 123, step 250 determines whether the pressure within the master cylinder circuit 12 is greater than the third pressure 123. If the pressure within the master cylinder circuit 12 is greater than the third pressure 123, the method 200 moves to step 252 and allows full transfer of fluid pressure from the master cylinder circuit 12 through the ABS valves 21-24 to the wheel circuits 16-19 for any fluid pressure greater than the third pressure 123 of the master cylinder circuit 12. This is the portion of the metered hydraulic schedule 116 shown on the chart 100 to the right of the third pressure 123.

Regardless of the mode of operation chosen for the ABS valves 21-24 in steps 242-252, the method 200 will determine whether the actual pressure in the wheel circuits 16-19 exceeds the commanded pressure. At step 254, the method 200 compares the actual pressure (or wheel brake pressure) in the wheel circuits 16-19, labeled as "WP_ACTUAL" in FIG. 4, with the commanded pressure, labeled as "WP_CMD."

If the actual pressure is greater than the commanded pressure, the method 200 moves to step 256 and engages the bleed function of the ABS valves 21-24. However, if the actual pressure is not greater than the commanded pressure—due to a constant or increasing braking request—the method continues to step 258 without activating the bleed function.

At step 258 the method 200 determines whether the braking signal is equal to zero, which generally occurs when the braking request has ended. If the braking request signal is not equal to zero, the method 200 proceeds to step 260 because further hydraulic braking is needed, and then returns to step 242 and continues looping steps 242-260. However, if the signal is equal to zero, the method 200 proceeds to step 262 because no further braking is needed. Step 262 ends the hydraulic braking until another braking request is received. Step 234 and step 262 may generally occur together and end all braking for the vehicle and brake system 10.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method for controlling hydraulic braking and regenerative braking in a hybrid brake system having a master cylinder circuit and a wheel circuit which are filled with a fluid and are separated by an anti-lock brake system (ABS) valve, and having a brake actuator in direct communication with the master cylinder circuit, the method comprising:
   allowing depression of the brake actuator in response to a braking request, wherein depression of the brake actuator creates fluid pressure, beginning at a first pressure, in the master cylinder circuit;
   commanding variable regenerative braking upon depression of the brake actuator until the regenerative braking reaches a threshold level; and
   commanding variable hydraulic braking upon depression of the brake actuator, such that the wheel circuit reaches a commanded wheel circuit pressure, including:
      preventing transfer of fluid pressure from the master cylinder circuit through the ABS valve to the wheel circuit when the fluid pressure in the master cylinder circuit is between the first pressure and a second pressure;
      partially limiting transfer of fluid pressure from the master cylinder circuit through the ABS valve to the wheel circuit when the fluid pressure in the master cylinder circuit is between the second pressure and a third pressure; and
      allowing full transfer of fluid pressure from the master cylinder circuit through the ABS valve to the wheel circuit when the fluid pressure in the master cylinder circuit is greater than the third pressure.

2. The method of claim 1, further comprising:
   determining whether regenerative braking is available; and
   if regenerative braking is not available, commanding the ABS valve to a bypass state, wherein the bypass state includes commanding variable hydraulic braking to allow full transfer of fluid pressure from the master cylinder circuit through the ABS valve to the wheel circuit when the fluid pressure in the master cylinder circuit is greater than the first pressure.

3. The method of claim 2, wherein the hybrid brake system further includes a pressure sensor operatively connected to the brake actuator, and further comprising:
   monitoring a master cylinder circuit pressure;
   generating a pressure signal from the monitored pressure of the master cylinder circuit; and
   wherein commanding variable regenerative braking upon depression of the brake actuator occurs in response to the pressure signal from the pressure sensor.

4. The method of claim 3, further comprising:
   monitoring an actual wheel circuit pressure; and
   bleeding fluid pressure from the wheel circuit when the actual wheel circuit pressure exceeds the commanded wheel circuit pressure, wherein bleeding fluid pressure from the wheel circuit occurs through the ABS valve.

5. The method of claim 4, further comprising reacting depression of the actuator with hydraulic back-pressure of the master cylinder circuit, wherein the hydraulic back-pressure is created by the ABS valve.

6. The method of claim 5, further comprising setting the second pressure of the master cylinder circuit when regenerative braking reaches the threshold level.

7. The method of claim 2, wherein the hybrid brake system further includes a position sensor operatively connected to the brake actuator, and further comprising:
   monitoring a position of the brake actuator;
   generating a position signal from the monitored position of the brake actuator; and
   wherein commanding variable regenerative braking upon depression of the brake actuator occurs in response to the position signal.

8. A method for controlling hydraulic braking and regenerative braking in a hybrid brake system having a master cylinder circuit filled with fluid and in fluid communication with a first wheel brake through a first anti-lock brake system (ABS) valve and in fluid communication with a second wheel brake through a second ABS valve, and having a brake actuator in direct communication with the master cylinder circuit, the method comprising:
   allowing depression of the brake actuator in response to a braking request, wherein depression of the brake actuator creates fluid pressure, beginning at a first pressure, in the master cylinder circuit;
   commanding variable regenerative braking upon depression of the brake actuator until the regenerative braking reaches a threshold level; and
   commanding variable hydraulic braking upon depression of the brake actuator, such that the first wheel brake reaches a first commanded wheel brake pressure and the second wheel brake reaches a second commanded wheel brake pressure, including:
      preventing transfer of fluid pressure from the master cylinder circuit through the first and second ABS valves to the first and second wheel brakes when the fluid pressure in the master cylinder circuit is between the first pressure and a second pressure;
      partially limiting transfer of fluid pressure from the master cylinder circuit through the first and second ABS valves to the first and second wheel brakes when the fluid pressure in the master cylinder circuit is between the second pressure and a third pressure; and
      allowing full transfer of fluid pressure from the master cylinder circuit through the first and second ABS valves to the first and second wheel brakes when the fluid pressure in the master cylinder circuit is greater than the third pressure.

9. The method of claim 8, further comprising setting the second pressure of the master cylinder circuit when the regenerative braking reaches the threshold level.

10. The method of claim 9, further comprising:
    monitoring pressure of the master cylinder circuit;
    monitoring pressure of the first and second wheel brakes;
    bleeding fluid pressure from the first wheel brake when the monitored pressure of the first wheel brake exceeds the first commanded wheel brake pressure, wherein bleeding fluid pressure from the first wheel brake occurs through the first ABS valve; and
    bleeding fluid pressure from the second wheel brake when the monitored pressure of the second wheel brake exceeds the second commanded wheel brake pressure, wherein bleeding fluid pressure from the second wheel brake occurs through the second ABS valve.

11. The method of claim 10, further comprising:
determining whether regenerative braking is available; and
if regenerative braking is not available, commanding the first and second ABS valves to a bypass state, wherein the bypass state allows full transfer of fluid pressure from the master cylinder circuit through the first and second ABS valves to the first and second wheel brakes when the fluid pressure in the master cylinder circuit is greater than the first pressure.

12. The method of claim 11, wherein the hybrid brake system further includes a pressure sensor operatively connected to the brake actuator, and further comprising:
generating a pressure signal from the monitored pressure of the master cylinder circuit; and
wherein commanding variable regenerative braking upon depression of the brake actuator occurs in response to the pressure signal from the pressure sensor.

13. The method of claim 11, wherein the hybrid brake system further includes a position sensor operatively connected to the brake actuator, and further comprising:
monitoring a position of the brake actuator;
generating a position signal from the monitored position of the brake actuator; and
wherein commanding variable regenerative braking upon depression of the brake actuator occurs in response to the position signal.

* * * * *